United States Patent [19]

Heimsoth et al.

[11] Patent Number: 5,481,724
[45] Date of Patent: Jan. 2, 1996

[54] PEER TO PEER COMPUTER-INTERRUPT HANDLING

[75] Inventors: Arthur J. Heimsoth, Coral Springs; Ernest N. Mandese, Boynton Beach; Joseph P. McGovern, Boca Raton; Richard N. Mendelson, Highland Beach, all of Fla.

[73] Assignee: International Business Machines Corp., Armonk, N.Y.

[21] Appl. No.: 43,331

[22] Filed: Apr. 6, 1993

[51] Int. Cl.⁶ .................................................. G06F 13/00
[52] U.S. Cl. ............................ 395/200.01; 364/DIG. 1; 364/229; 364/230.1; 364/232.7; 364/240; 364/241.2; 364/242.2; 395/741; 395/293
[58] Field of Search ........................... 395/325, 725, 395/200, 275

[56] References Cited

U.S. PATENT DOCUMENTS

| | | | |
|---|---|---|---|
| 4,354,229 | 10/1982 | Davis et al. | 395/325 |
| 4,420,806 | 12/1983 | Johnson, Jr. et al. | 395/725 |
| 4,604,500 | 8/1986 | Brown et al. | 379/269 |
| 4,698,746 | 10/1987 | Goldstein | 395/200 |
| 4,805,096 | 2/1989 | Crohn | 395/725 |
| 4,930,070 | 5/1990 | Yonekera et al. | 395/725 |
| 5,185,864 | 2/1993 | Bonevento et al. | 395/275 |
| 5,247,616 | 9/1993 | Berggren | 395/200 |
| 5,265,255 | 11/1993 | Bonevento et al. | 395/725 |
| 5,282,272 | 1/1994 | Guy et al. | 395/325 |
| 5,317,747 | 5/1994 | Mochida et al. | 395/725 |

OTHER PUBLICATIONS

IBM Personal System/2 Hardware Interface Technical Reference Manual, Move Mode Subsection of Subsystem Control Block Architecture Section, pp. 1–16–1–17, 1–29–1–32, 2–5–2–8 Jan. 1991.

*Primary Examiner*—Jack B. Harvey
*Assistant Examiner*—Ayaz R. Sheikh
*Attorney, Agent, or Firm*—George E. Grosser; Homer L. Knearl

[57] ABSTRACT

A coded logical interrupt signal is sent between system or subsystem units in a data processing system. The logical interrupt is sent by a sending unit, that requests the interrupt, and is sent to a receiving unit that the sending unit wishes to interrupt. These coded logical interrupts are accumulated in the receiving unit. When the receiving unit is actually physically interrupted by control of the processor in the unit, all logical interrupts that have been accumulated are processed. The logical interrupt may be coded to indicate sending unit, that is the source of the interrupt, and the action being requested by the sending unit. If the interrupt includes only source information, the action information is sent separately by the sending unit to memory in the receiving unit. If the interrupt includes both source identification and action information, the receiving unit can interpret source and action directly from the interrupt.

11 Claims, 6 Drawing Sheets

PEER TO PEER COMPUTER-INTERRUPT HANDLING

BACKGROUND OF THE INVENTION

1. Field of the Invention

This invention is directed to handling interrupts in a data processing system where communications may flow between system and subsystem or subsystem and subsystem as peer-to-peer communications. More particularly, the invention relates to handling interrupts in a peer-to-peer system more efficiently to reduce total system latency.

2. Description of Prior Art

Interrupt handling in a data processing system on a peer-to-peer basis is performed in the IBM PS/2 computers and is described in the *IBM Personal System/2* Hardware Interface Technical Referencemanual in the Move Mode subsection of the Subsystem Control Block Architecture section, at pages 1-16 to 1-17, 1-29 to 1-32 and 2-5 to 2-8 (January, 1991). The PS/2 interrupt handling system advanced the art by providing the ability for subsystems to interrupt each other and communicate with each other without intervention by the system unit. In effect, the communication responsibility between subsystem units was moved from the main system unit to the subsystem units.

Each subsystem unit was given a bus master processor that arbitrated for control of the system bus with the main system unit and bus masters on all the other subsystem units or adapter cards. When a bus master was granted access to the bus, it sent an interrupt and a communication signal to the unit (system or subsystem) it wished to communicate with. The receiving unit would detect the interrupt and then search its memory for receipt of a signal message from the sending unit. Only one interrupt can be processed at a time in a given receiving unit. Also, the receiving unit must search its memory to determine which sending unit is requesting communication with it. Accordingly, there is some system latency in handling one interrupt at a time and searching memory to identify the source of the interrupt.

SUMMARY OF THE INVENTION

It is an object of this invention to reduce the system latency in peer to peer interrupt handling in a data processing system.

It is a further object of this invention to identify the sources of the interrupts from the interrupt itself rather than from additional communicated signals.

In accordance with this invention, the above objects are accomplished by sending a coded logical interrupt signal between system or subsystem units in the system. The logical interrupt is sent by a sending unit that requests the interrupt, and is sent to a receiving unit that the sending unit wishes to interrupt. These coded logical interrupts are stored in interrupt storage register in the receiving unit. When the receiving unit is actually physically interrupted by control of the processor in the unit, all logical interrupts that have been accumulated are processed.

The logical interrupt signals contain more information than merely that they are an interrupt. The logical interrupt may be coded to indicate the source of the interrupt, and may be coded to include action information associated with the interrupt. In one embodiment, an interrupt bit from a sending unit is stored in a storage location in the interrupt storage register in the receiving unit, and that storage location is associated with the sending unit that is the source of the interrupt. The action information is sent separately by the sending unit to action storage memory in the receiving unit. The action information is associated with the interrupt from the same sending unit.

In another embodiment of the invention, the interrupt signal is an interrupt/action code that includes both source identification and action information. This interrupt/action code receiving unit can interpret source and action directly from the interrupt/action code. The code is translated to a set location in a source identification register. That location is then associated not only with the source of the interrupt but also the action being requested by that source.

The great advantage of the invention is that the system efficiency in peer-to-peer interrupt handling is greatly enhanced. Now, when a unit of the system is interrupted, the unit can perform the actions required by all pending interrupts for that unit. Further, the unit rapidly identifies the action required for each interrupt because it does not have to search its memory to identify the interrupt source and the action message. Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 1:
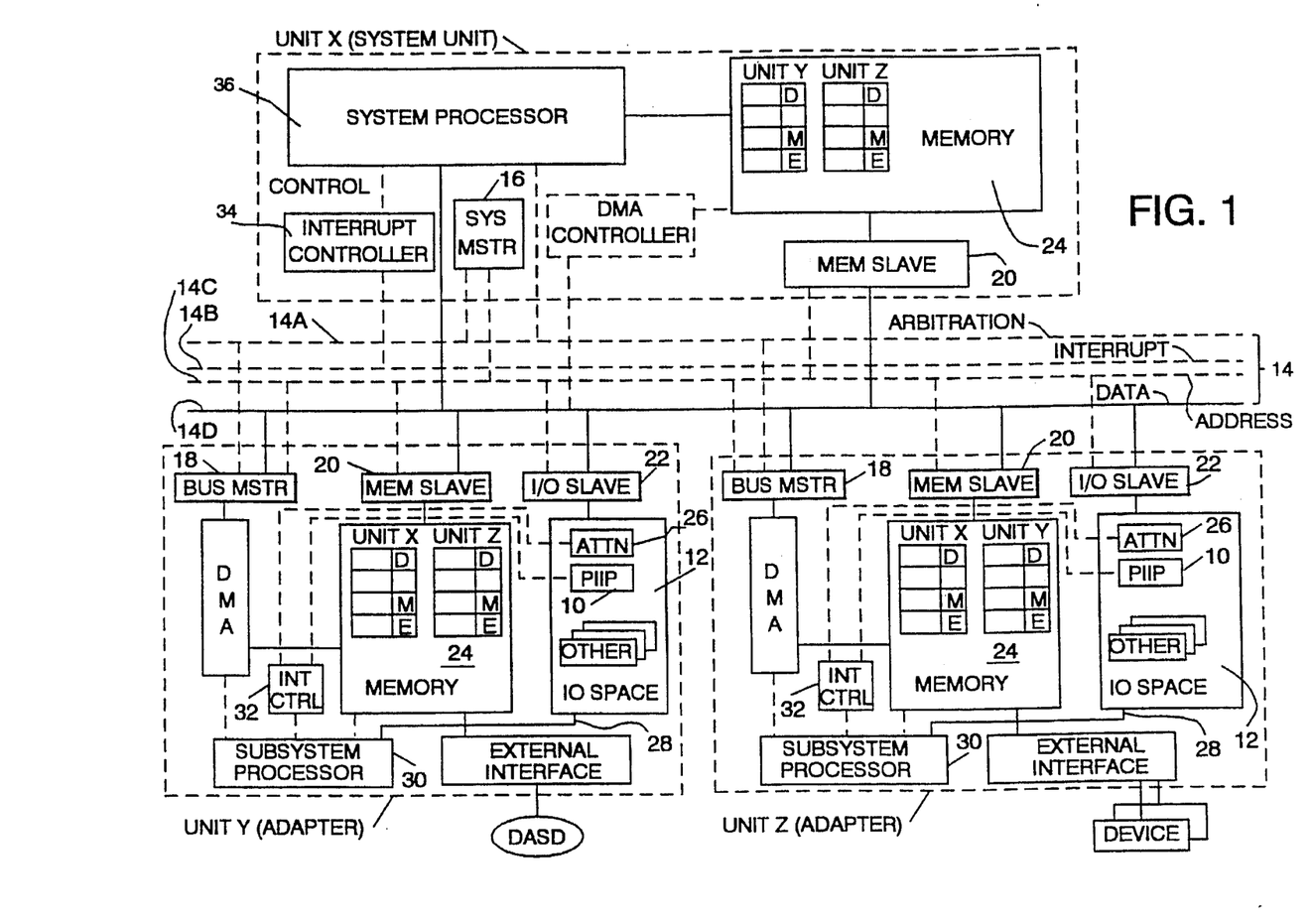
FIG. 1 shows one preferred embodiment of the invention where the bit position in a PIIP (Peer Interrupt Identification Port) word identifies the source of the interrupt.

The preferred embodiment of the invention shown in FIG. 1 uses a Peer Interrupt Identification Port (PIIP) port 10 on a PIIP board 12 in each subsystem unit. The computer in FIG. 1 is shown with a system unit (Unit X) and two subsystem units (Unit Y and Unit Z). In this preferred embodiment, there may be up to 15 subsystem units.

Identical components in the units are given the same reference numeral. In this description, when components are referred to globally, their common reference numeral will be used. When a component in a given unit is described, the component will be identified by the reference numeral with a suffix for the unit. Thus, PIIP port 10Y in this description identifies PIIP port 10 in Unit Y in FIG. 1.

The system unit X and subsystem units Y and Z communicate over bus 14. Bus 14 includes arbitration, interrupt, address and data buses. In FIG. 1, the data bus and data lines are shown in solid line; the control buses and control lines are shown as dot or dash lines. Data transfers between the units are controlled by the system master 16 in system unit X, and by bus masters 18 in each of the subsystem units. Only one master has control of bus 14 at any one time. Each master is assigned a priority. Control of the bus is arbitrated between the masters over arbitration bus 14A based on the priority of the masters requesting control. When a master is given control over the bus, it controls data transfers between its unit as the source and its own unit or another unit as the target. The master addresses over address bus 14C the memory slave logic 20 and/or input/output (I/O) slave logic 22 in the target unit. In other words, the system master 16 or bus master 18 that wins the arbitration, controls all memory slaves 20 and I/O slaves 22 on the units.

Data transfers between units are preferably handled in a dual pipeline manner, as described in co-pending, commonly-assigned U.S. patent applications Ser. No. 7/411,145, filed Sep. 22, 1989, entitled "Apparatus and Method For Asynchronously Delivering Control Elements With a Pipe Interface" and Ser. No. 07/968,758, filed Oct. 30, 1992, entitled "Bus Master State Machine With Control Structures For Subsystem Control Blocks." In these data transfers, the sending unit must send an action message to the memory 24 of the receiving unit, identify itself as the source of the action message and set an interrupt request for the processor at the receiving unit. The action messages are Dequeue (D), Manage (M) or Enqueue (E). Each memory 24 has an assigned storage location called the signalling control area 25 for the action messages from the other units. For example, as shown in FIG. 1, memory 24Y has signalling control areas for Unit X and Unit Z.

To illustrate the operation of this preferred embodiment, assume that Unit Y wishes to request Dequeue action at Unit Z. When bus master 1BY gets control of the bus, it addresses the Unit Y signalling control area in memory 24Z over address bus 14C. Bus master 18Y then sends a byte containing the D (Dequeue) message over the data bus 14D to memory 24Z through memory slave logic 20Z. This D message is stored in the Unit Y signalling control area of memory 24Z.

Next, bus master 18Y addresses the PIIP port 10Z through the I/O slave logic 22Z, and sends the PIIP bit for unit Y via a byte over the data bus 14D. The I/O slave logic 22Z receives the byte. The PIIP bit in the byte is loaded into PIIP port 10Z in manner as to not overwrite the other bits in port 10Z. This might be done by masking the other bits in the byte from Unit Y, or if all the other bit positions are "0," the byte could be OR'd with the contents of port 10Z. In either case, the PIIP bit from Unit Y loaded into port 10Z indicates an interrupt request from Unit Y to the PIIP port 10Z.

Each bit in the PIIP port 10Z identifies, by its location in the port, the source or sending unit that has requested an interrupt of the target unit. Logic on the PIIP board 12Z detects the presence of a bit in the PIIP port 10Z and sends an interrupt request signal to the interrupt controller 32Z. Processor 30Z, when it wishes to handle interrupts, will read the contents of the ATTN (Attention) port 26Z and the PIIP port 10Z over bus 28Z. Processor 30Z identifies the units requesting action based on the location of bits in the PIIP word. Since processor 30Z knows from the Unit Y bit in the PIIP word that Unit Y requested an interrupt, the processor reads the Unit Y signalling control area in memory 24Z to determine the action requested. After the action request is read from a signalling control area, the action request in the control area is reset to zero.

Whenever the ATTN port 26Z is written with a hexadecimal D0, an interrupt request signal is passed by the interrupt controller 32Z to processor 30Z. The hexadecimal D0 is used by all units to request an interrupt of a specific subsystem unit processor 30. The ATTN port is used to handle interrupt requests other than PIIP bits and to accommodate units who are not capable of sending PIIP bits.

After processor 30Z has processed all PIIP bits in the PIIP word, it will then process any interrupt that was generated as a result of hexadecimal D0 written to the ATTN port 26Z. Processor 30Z receives the interrupt from ATTN port 26Z via the interrupt controller 32Z. The D0 interrupt has no information as to source of the interrupt. Therefore, the processor must scan all the signalling control areas in memory 24Z to determine if there is a pending action request.

In the preferred embodiment of FIG. 1, the system Unit X does not have an ATTN port or a PIIP port. Interrupts to the system unit are sent from the bus masters 18 in the subsystem units to the interrupt controller 34. The interrupt controller passes the interrupt to processor 36. When the interrupt request is granted by processor 36, it scans the Unit Y and Unit Z signalling control areas in memory 24X to determine which subsystems requested action from the system unit and what action, D, M or E, was requested.

Figure 2:
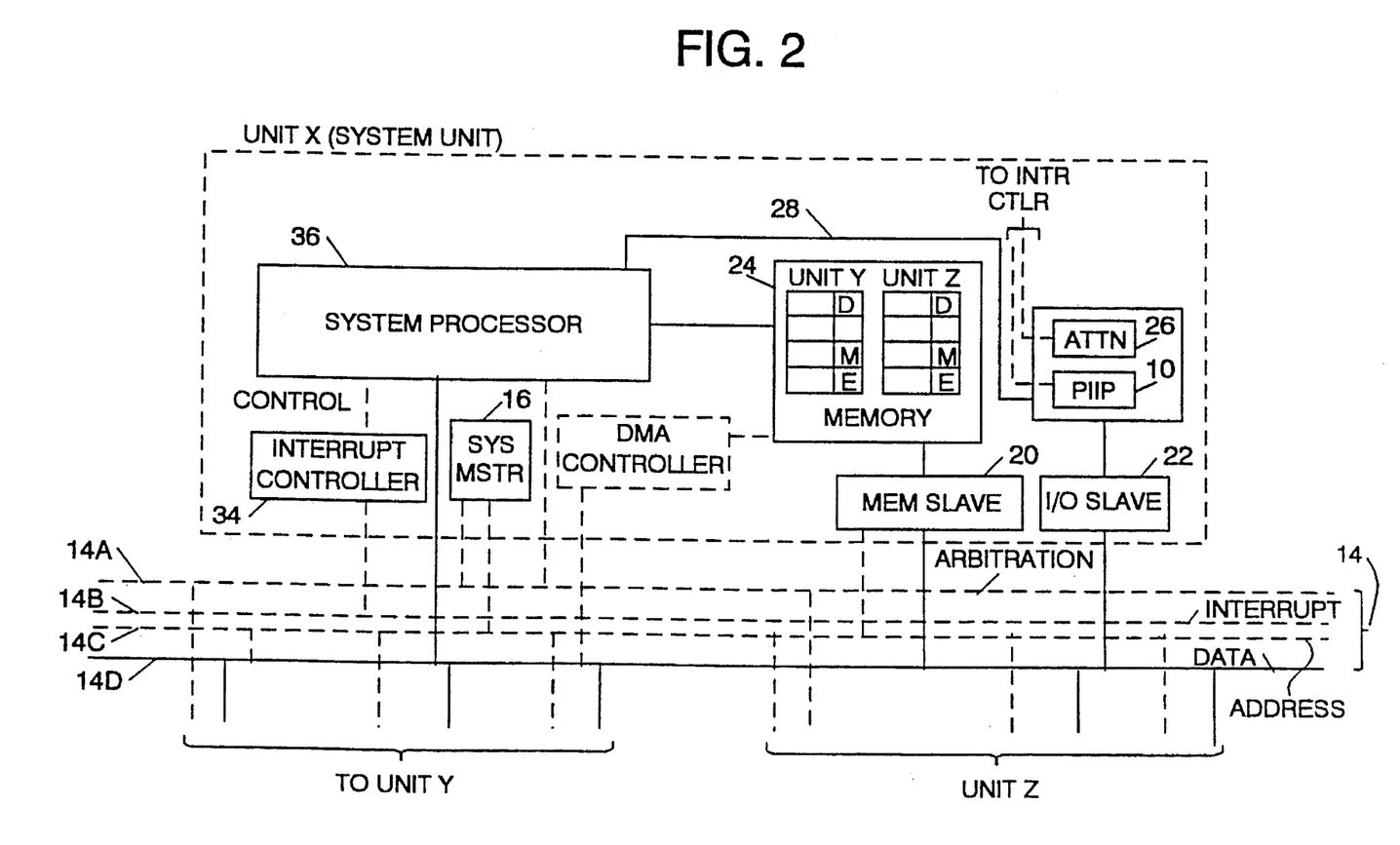
FIG. 2 is an alternative embodiment for the system unit of FIG. 1 where a PIIP port has been added to the system unit.

In another preferred embodiment of the invention in FIG. 2, the system unit does have an ATTN port and a PIIP port. In this embodiment, the system unit processes interrupts from the subsystem unit in the same manner as just described in FIG. 1 for communication between two subsystems. In other words, the bus master from the subsystem unit writes D, M or E bit into the subsystem's signalling control area in memory 24X. The bus master for the subsystem unit also writes the PIIP bit for the subsystem into PIIP port 10X. Logic on the PIIP module 12X sends an interrupt signal to the interrupt controller 34X. The interrupt controller passes the interrupt request to processor 36. When the processor services the interrupt request, it reads the PIIP bits from the PIIP word in port 10X. The processor identifies the requesting subsystems from the PIIP bits and reads their signalling control areas to determine the actions being requested by the subsystem.

Figure 3:
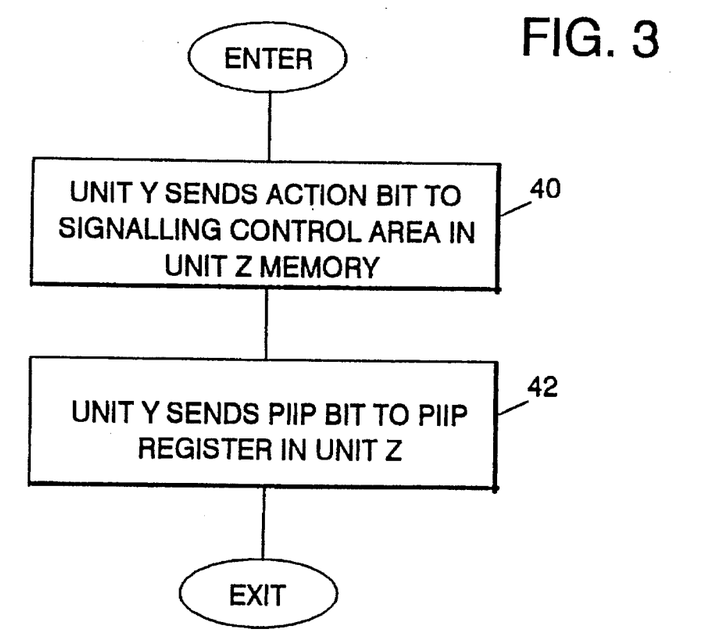
FIG. 3 is a flow diagram for the operation/process flow of an interrupt sending unit in the embodiment of FIG. 1.
Figure 4:
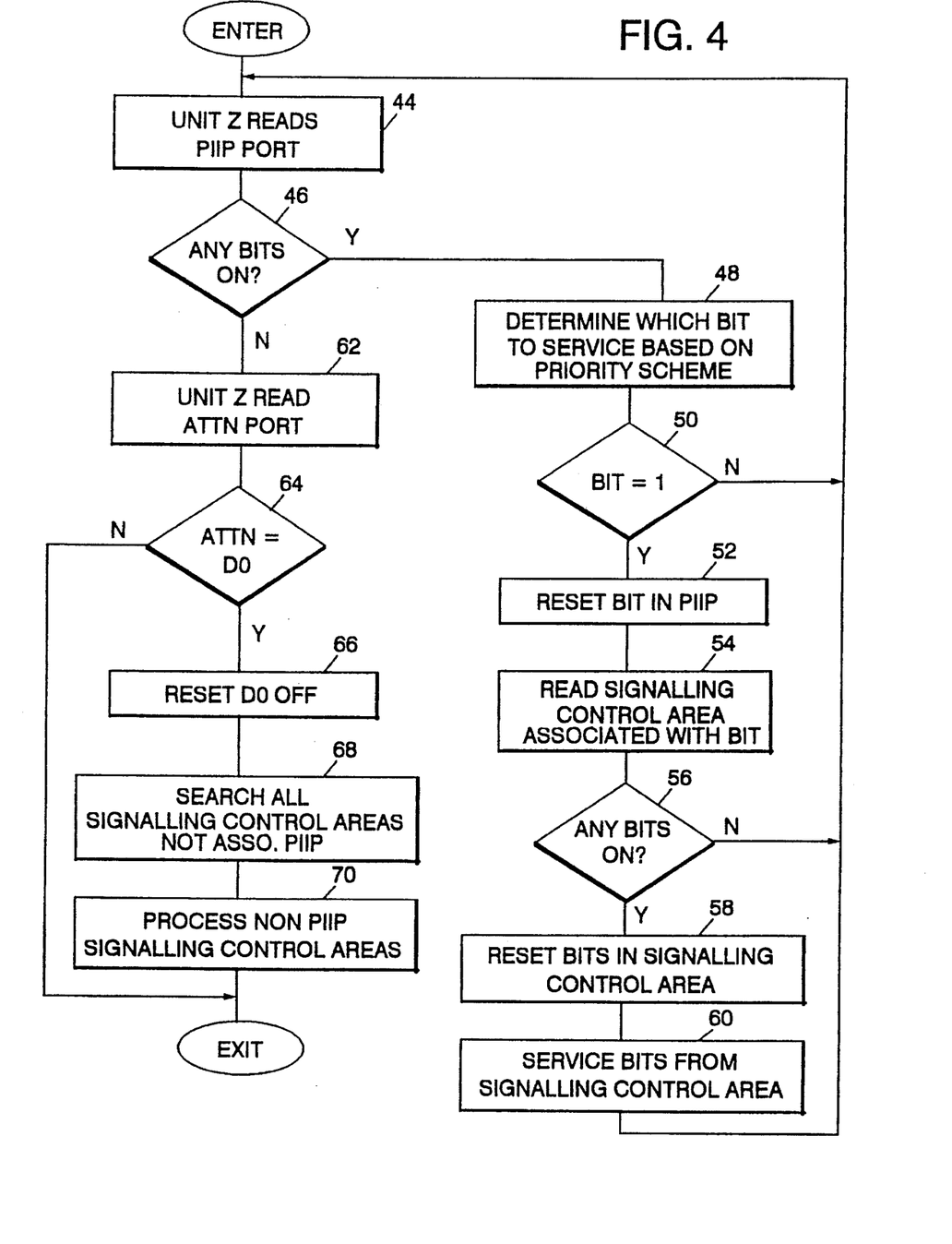
FIG. 4 is a flow diagram for the operation/process flow of an interrupt receiving unit in the embodiment of FIG. 1.

The operation or logic flow for the process of peer-to-peer interrupt handling between units in FIGS. 1 or 2 is shown in FIGS. 3 and 4. FIG. 3 shows the simple routine used by the bus master 18Y in a subsystem Unit Y for signalling an interrupt. FIG. 4 shows the routine used by the subsystem processors 30Z to interpret the interrupts.

In FIG. 3, operation 40 addresses Unit Y signalling control area in memory 24Z over memory slave 20Z, and sends an action bit in a byte over data bus 14D. As described for FIG. 1, memory slave logic 20Z writes the action bit into Unit Y area of memory 24Z. Operation 42 by bus master 18Y addresses the PIIP port 10Z through the I/O slave logic 22Z. As described in FIG. 1, the PIIP bit is loaded by logic 22Z into its preassigned location in PIIP port 10Z. The preassigned location identifies Unit Y as the source of the interrupt request.

The interpretation of interrupts by processor 30Z begins with operation 44 in FIG. 4. Operation 44 reads the PIIP word from PIIP port 10Z. Decision 46 tests whether any PIIP bits in the port are set on. If the answer is yes, the process branches to operation 48. In operation 48, processor 30Z services the PIIP bits according to a predetermined priority. Any priority algorithm may be used. The priority might simply be based on processing the PIIP word from most significant digit to least-significant digit.

In whatever manner a bit of the PIIP word is selected, decision 50 checks to see if the bit is a "1." If the bit is a "0," the process loops back to operation 44. If the bit is a 1, operation 52 resets the bit position in port 10Z to 0. Next, operation 54 reads the signalling control area in memory 24Z associated with the bit that was a 1. For example, if the PIIP bit was associated with Unit Y, operation 54 would read the Unit Y signalling control area in memory 24Z.

Decision 56 in FIG. 4 tests whether any action bits in the signalling control area read by operation 54 were "ON" or set to 1. If no action bits were on, the process again loops back to operation 44 to read the PIIP port. If one or more action bits were ON, the process branches to operation 58. Operation 56 resets bits in the signalling control area to 0, and operation 60 services the bits that were ON or 1. For example, if the E (Enqueue) action bit had been on, Unit Z would begin an enqueue operation, as described in the above-identified applications on dual pipeline data transfers between units. After the action bits are serviced by operation 60, the process loops back to operation 44.

When all PIIP bits in the PIIP word have been processed, decision 46 will detect that all the PIIP bits are OFF or 0. Process will branch to operation 62 where processor 30Z reads the ATTN port 26Z. If a non-PIIP subsystem has set an interrupt code "D0" in ATTN port 26Z, decision 64 will branch Yes to operation 66. If there is no interrupt in ATTN port, decision 64 branches No, and the interrupt interpretation routine is completed.

After operation 66 resets the ATTN port, operation 68 searches for signalling control areas in memory 24Z that are not associated with PIIP bits. In other words, the subsystem processor has no information about the source of the D0 interrupt except that it did not come from a subsystem equipped to use PIIP. When the processor finds a non-PIIP signalling control area with an action bit ON, operation 70 processes the signalling control area in the same manner as operations 58 and 60 previously described. After all non-PIIP signalling control areas have been searched and processed by operations 68 and 70, the interpret interrupts routine is completed until it is called again to start at operation 44.

Figure 5:
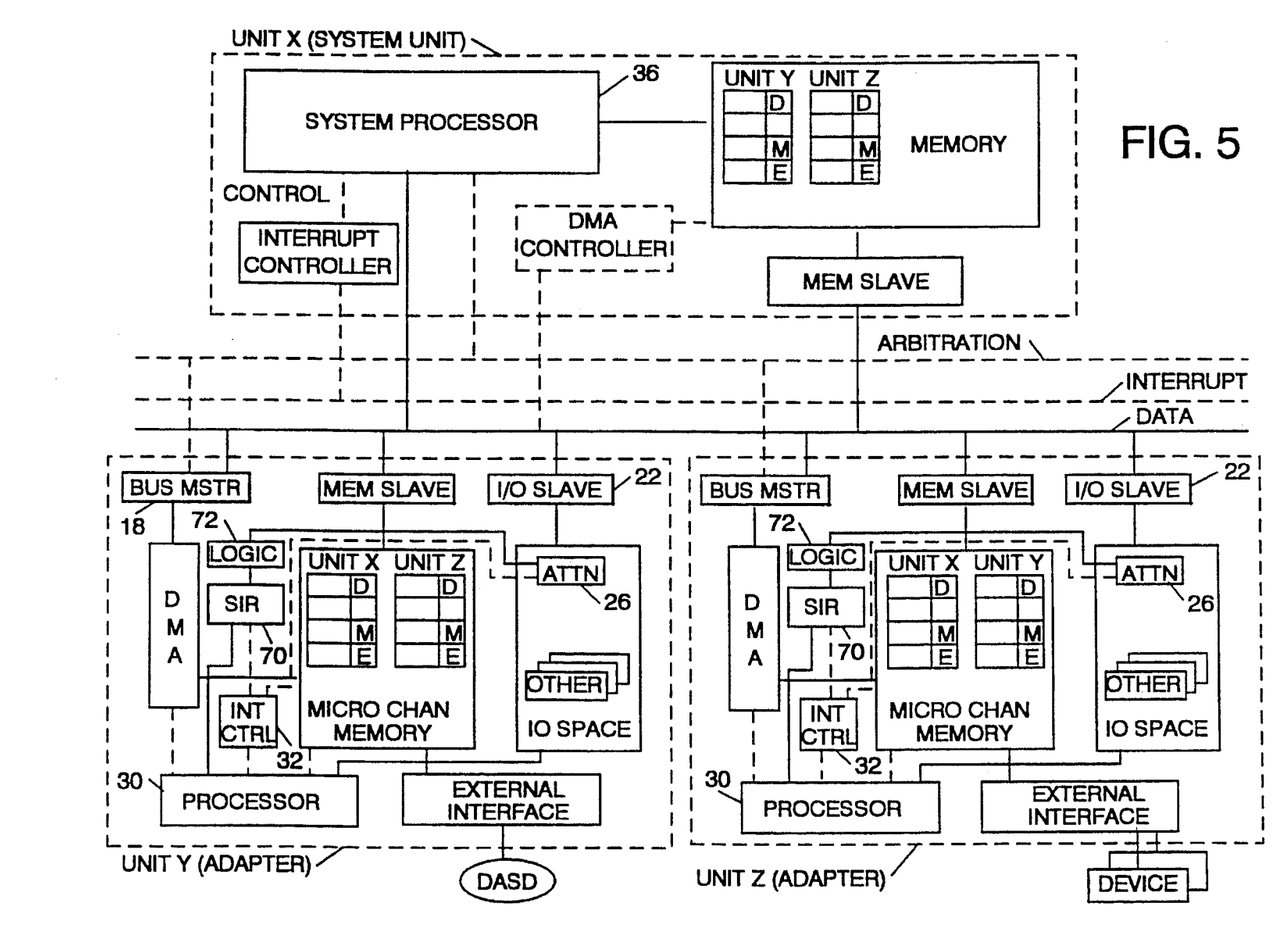
FIG. 5 shows another preferred embodiment of the invention where the interrupt is a multi-bit code that identifies both the source and the action requested by the source, and where the bit position in a SIR (Source Identification Register) identifies the interrupt code.

An alternative preferred embodiment of the invention is shown in FIG. 5 where the PIIP port 10 has been replaced by an SIR (Source Identification Register) 70. Only the differences in structure and operation of FIG. 5 from FIG. 1 will be described. There is no PIIP port in FIG. 5. Interrupt signal codes from other units are received at the ATTN port 26. The interrupt signal codes preferably include source identification information and action information. The interrupt signal codes in the ATTN port 26 are decoded by SIR logic 72. SIR logic 72 decodes each interrupt signal code into an SIR bit at a predefined location in the SIR register 70. The location of bits in the SIR register 70 indicates the interrupt signal code received at the ATTN port. Processor 30 reads the SIR bits from SIR register 70 and, from the location of ON or "1" bits in register 70, interprets the interrupt signal code received. Interrupt controller 32 receives interrupt signals either by detecting a D0 interrupt code in ATTN port 26, or by detecting any bit in SIR 70.

One operative difference between the embodiment of FIG. 1 and the embodiment of FIG. 5 is that the interrupt signal codes are more than a single bit. In FIG. 5, the interrupt signal codes are hexadecimal codes, such as D1, D2, D3, etc. In contrast, the PIIP port 10 in FIG. 1 had one bit for each unit that might send a PIIP interrupt bit and the location of that bit in the PIIP port identified the sending unit.

In SIR 70, the location of a bit only identifies an interrupt signal code. Processor 30 uses the identity of the interrupt signal code from the bit location in SIR 70 to interpret the interrupt signal code. For example, processor 30 would know that bit location four in the SIR corresponds to hexadecimal interrupt signal code D3. Processor 30 then uses a table look-up routine to interpret code D3.

The interrupt signal code content includes the source identification of the sending unit, and preferably the action requested by the interrupting source. For example, D1 signal code indicates Unit Y requesting dequeue action, D2 signal code indicates Unit Y requesting enqueue action, etc. The advantage of encoding the action request into the interrupt signal code is two fold. First, the action bit does not have to be written to the signalling control area in the receiving unit. Second, the processor in the receiving unit does not have to read a signalling control area to get the action request information.

The size of the SIR may be extended to store any number of SIR bits. The size of SIR 70 and the associated decode logic 72 are fixed at design time for each unit. Preferably, SIR 70 and logic 72 are designed to accommodate the maximum possible number of units in the system, and thus they may easily accommodate subsystem units as they are added to the system. Also, the interrupt signal codes used in the system are changed by software. The system Unit X processor 36 defines the interrupt signal codes to be sent by each unit; this is done by sending a control message to processor 30 in each unit. Further, system processor 36 can set the interrupt interpretation table used by each processor 30 to interpret received codes. For example, if SIR 70 and logic 72 are designed to accommodate 128 bits and thus 128 interrupt signal codes, Unit X processor 36 would define the interrupt signal codes from D1 to D128 and notify the subsystem unit interpretation tables of the bit position for each SIR bit and its meaning.

Figure 6:
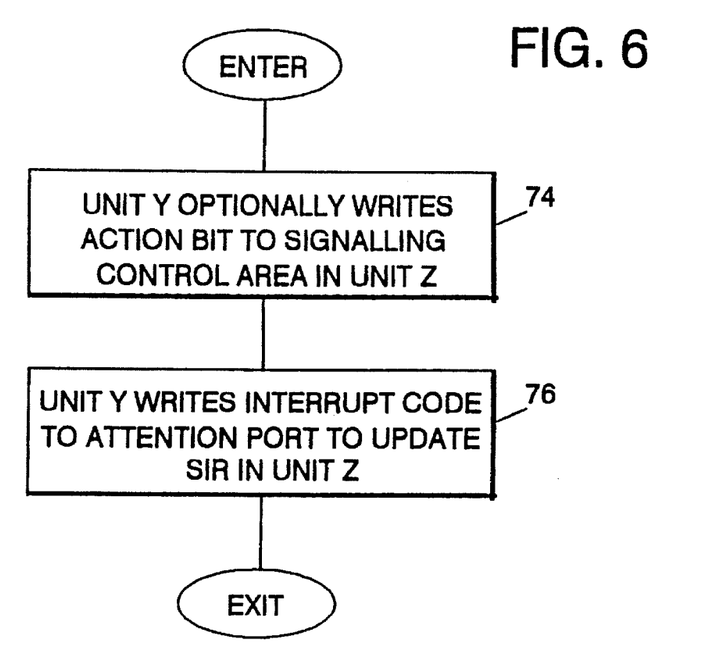
FIG. 6 is a flow diagram for the operation/process flow of an interrupt sending unit in the embodiment of FIG. 6.
Figure 7:
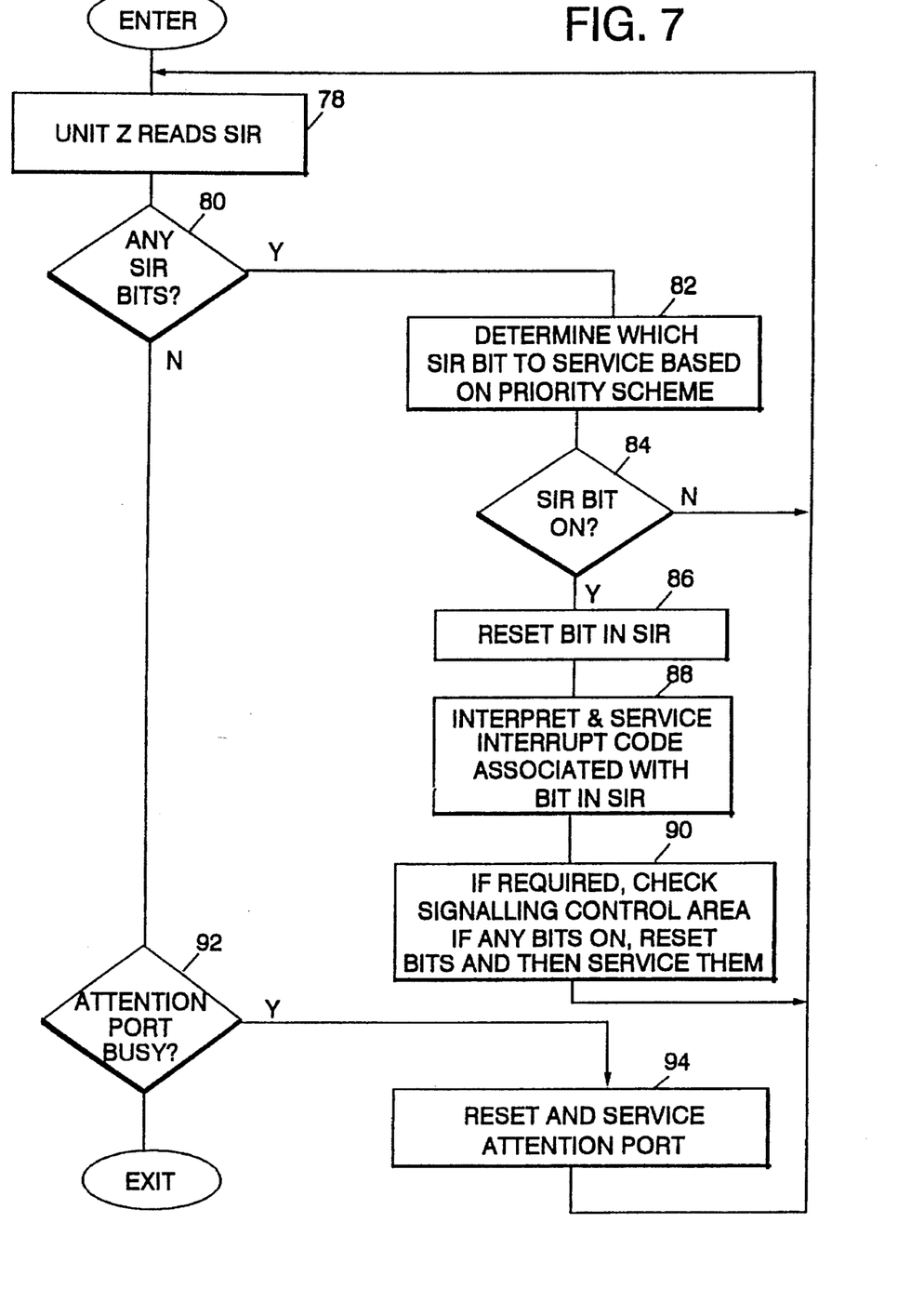
FIG. 7 is a flow diagram for the operation/process flow of an interrupt receiving unit in the embodiment of FIG. 6.

FIGS. 6 and 7 show the operation/logic flow of Unit Y as a sending or interrupt requesting unit, and Unit Z as a receiving or interrupt interpreting unit for the SIR embodiment of the invention in FIG. 5. In FIG. 6, the subsystem processor 30Y runs the program. In operation 74, bus master 18Y may write an action bit to the Unit Y signalling control area in memory 24Z. The operation is optional in that this operation could be replaced by encoding the action request into the interrupt signal code as described above. In operation 76 of FIG. 6, bus master 18Y writes the interrupt signal code to ATTN port 26Z. This interrupt signal code passes through the ATTN port 26Z but is not stored there. The attention port does include a register, but the only interrupt signal stored there is D0, as will be explained hereinafter in the description of FIG. 7.

In FIG. 7, when processor 30Z is ready to interpret interrupt signal codes, operation 78 is called. Operation 78 reads the contents of SIR register 70Z into the processor 30Z. Decision 80 tests for the presence of any SIR bits from SIR 70Z. If the answer is Yes, the process branches to operation 82. In operation 82, the SIR bits are processed in accordance with a priority algorithm. Based on priority, an SIR bit location in the SIR register is selected. Decision 84 tests whether that SIR bit is ON. If the SIR bit is not set, the process loops back through operation 78 and decision 80. Operation 82 then selects the SIR bit with next highest priority.

When decision 84 detects that the selected SIR bit is present, the process branches to operation 86. Operation 86 resets the SIR bit OFF. In operation 88, processor 30Z identifies the interrupt signal code from the location of the SIR bit in SIR 70Z, and interprets the interrupt signal code by looking up in the interrupt interpretation table the source of and action requested by the interrupt. If the interrupt signal code includes the action request, operation 88 also processes the action request. If the interrupt signal code is simply interrupt source identification, operation 90 processes the associated signalling control area for the action requested by the interrupt source. Operation 90 would be the same as that previously described for operations 54, 56, 58 and 60 in FIG. 4. After operation 90, the process loops back to operations 78, 80 and 82 to look for more SIR bits.

When all the SIR bits in SIR 70Z have been serviced by processor 30Z, decision 80 branches to decision 92. Decision 92 is testing for a D0 interrupt flag in the ATTN port 26Z. If there is a D0 interrupt flag in the ATTN port, operation 94 resets the port and services the interrupt stored at the ATTN port 26Z. Decision 92 and operation 94 are provided to handle interrupt requests from units not equipped to send interrupt signal codes other than hexadecimal D0. Operation 94 would service the D0 interrupt signal code in the same manner as previously described for operations 62, 64, 66, 68 and 70 in FIG. 4.

While a number of preferred embodiments of the invention have been shown and described, it will be appreciated by one skilled in the art, that a number of further variations or modifications may be made without departing from the spirit and scope of our invention.

What is claimed is:

1. In a data processing system having multiple processing units, apparatus for handling logical and other interrupts from a first processing unit as a sending unit to a second processing unit as a receiving unit, wherein any one of said multiple processing units may function as a sending unit, and wherein any one of said multiple processing units may function as a receiving unit, said apparatus comprising:

means in the sending unit for sending a coded logical interrupt to the receiving unit for processing at the receiving unit, said coded logical interrupt being coded to indicate an interrupt request and including source identification information identifying the sending unit that requests an interrupt of the receiving unit;

means in the receiving unit for receiving said coded logical interrupts and other interrupts;

interrupt storage means in the receiving unit for storing a plurality of coded logical interrupts received by said receiving means from a plurality of sending units;

means for providing an interrupt request when at least one coded logical interrupt is stored in said interrupt storage means or when an other interrupt is received by said receiving means;

processing means in the receiving unit in response to the interrupt request for reading all of the coded logical interrupts in said interrupt storage means during said processing means's next interrupt processing operation and for processing each such read coded logical interrupt to identify the sending unit for each such read logical interrupt:

said interrupt storage means having a unique storage location assigned to each sending unit whereby said storage means stores each coded logical interrupt that is received in a storage location that is uniquely indicative of the identity of the sending unit sending the received coded logical interrupt; and said processing means including means identifying the sending unit for each coded logical interrupt from the unique storage location of the coded logical interrupt in said interrupt storage means.

2. The apparatus of claim 1 and in addition:

means in the sending unit for sending an action information assigned to the coded logical interrupt sent by the sending unit, said action information indicating the action being requested of the receiving unit;

action storage means in the receiving unit for storing the action information from the sending units; and said processing means responsive to the identification of the sending unit for each such read coded logical interrupt for reading the action information from said action storage means and servicing the action request from that sending unit.

3. The apparatus of claim 1 and in addition:

means in the sending unit for sending action information assigned to the coded logical interrupt sent by the sending unit, said action information indicating the action being requested of the receiving unit;

action storage means in the receiving unit for storing the action information from the sending units; and said processing means responsive to the identification of the sending unit for each such read coded logical interrupt for reading the action information from said action storage means and servicing the action request from that sending unit.

4. The apparatus of claim 1 and in addition:

said coded logical interrupt is a combined interrupt/action code identifying both the sending unit and the action request by the sending unit; and said processing means responsive to the interrupt/action code for identifying the sending unit sending the coded logical interrupt and the action requested by the sending unit.

5. The apparatus of claim 4 wherein said interrupt storage means comprises:

means for translating interrupt/action codes from each sending unit and setting a storage location to indicate the sending unit and the action requested by the sending unit.

6. The apparatus of claim 5 wherein said processing means comprises:

means responsive to the storage locations set by said translating means for identifying each sending unit and the action requested by the sending unit.

7. In a data processing system having a system unit and a plurality of subsystem units communicating over a bus, a method for handling attention interrupt signals and logical interrupt signals that are communicated between the system unit and the subsystem units, or that are communicated between the subsystem units, both types of communication being handled as peer-to-peer communications between a sending unit and a receiving unit, said method comprising the steps of:

sending a coded logical interrupt signal from a sending unit to a receiving unit, said coded logical interrupt signal indicating an interrupt request and identifying the sending unit sending the coded logical interrupt signal;

receiving in the receiving unit the attention interrupt signals and the coded logical interrupt signals;

storing in the receiving unit one or more coded logical interrupt signals received from a plurality of sending units;

generating an interrupt request in the receiving unit if an attention interrupt signal has been received by the receiving unit as a result of said receiving step, or if at least one coded logical interrupt signal has been stored in the receiving unit as a result of said storing step;

if an interrupt request is generated as a result of said generating step, then during next occurring interrupt processing cycle at the receiving unit, processing all of the stored coded logical interrupt signals to identify all of the sending units that sent coded logical interrupt signals to the receiving unit;

said storing step storing the coded logical interrupt signal from each sending unit in a unique storage location that is assigned to each sending unit; and said processing step identifying the sending unit for each stored coded logical interrupt signal from the unique storage location that is assigned to each sending unit.

8. The method of claim 7 and in addition:

sending action information assigned to said coded logical interrupt signal, said action information indicating the action requested by the sending unit;

storing in the receiving unit action information assigned to each coded logical interrupt signal from the plurality of sending units;

reading the stored action information at the receiving unit for each sending unit that is identified by said processing step; and servicing the read action information from the identified sending units.

9. The method of claim 7 and in addition:

said coded logical interrupt signal is a combined interrupt/action code identifying both the source sending unit of the coded logical interrupt and the action requested by the source sending unit; and said processing step identifying from the interrupt/action code the source sending unit and the action requested by the source sending unit.

10. The method of claim 9 wherein said storing step comprises the steps of:

translating interrupt/action codes from a source sending unit; and setting a signal in a storage location, said storage location being indicative of the source sending unit and the action requested.

11. The method of claim 10 wherein said processing step identifies the source sending unit and the action requested by the source sending unit from the storage location that is set by said setting step.

* * * * *